Aug. 7, 1934.  G. E. GAUS  1,968,937
METHOD FOR INSERTING IDENTIFICATION TAG FASTENERS
Filed Dec. 16, 1932
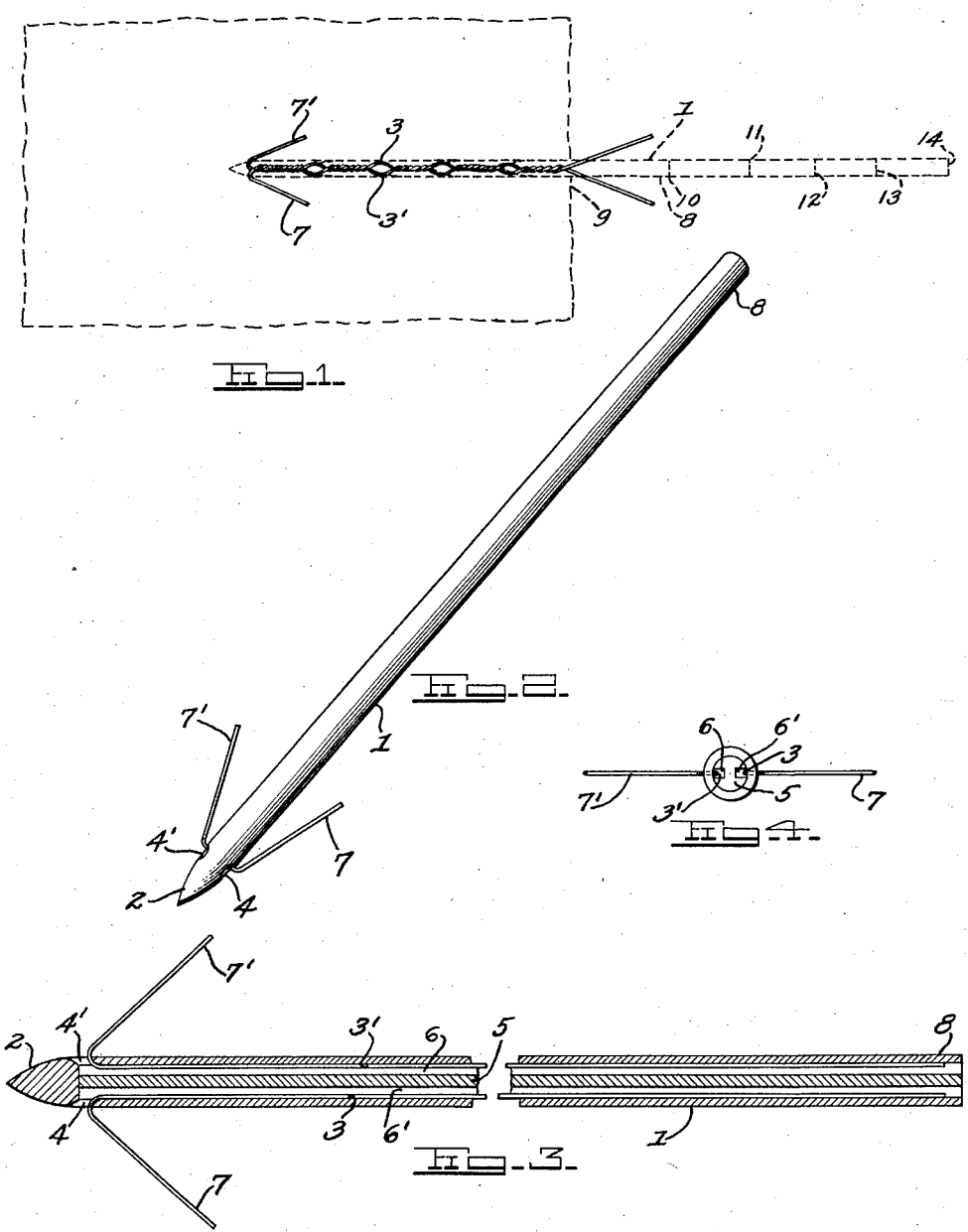
INVENTOR
George E. Gaus
By: [signature]
attorney.

Patented Aug. 7, 1934

1,968,937

UNITED STATES PATENT OFFICE 1,968,937

METHOD FOR INSERTING IDENTIFICATION TAG FASTENERS

George E. Gaus, Washington, D. C., dedicated to the free use of the Government and the People Application December 16, 1932, Serial No. 647,600

2 Claims. (Cl. 40—22)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to me of any royalty thereon.

I hereby dedicate this invention to the free use of the Government and the People of the United States.

My invention relates to inserting identification tag fasteners within bales of fibrous materials, particularly cotton, whereby the particular bales to which the tags have been applied may be identified in event the customary means of identification are effaced, destroyed, or changed; and has for its object to provide a simple method for inserting within the baled material a durable identification tag fastener arranged in such manner that it cannot be readily removed or be replaced.

In order to carry out the purposes of my invention, reference is to be had to the peculiar combinations and arrangement of parts as shown in the accompanying drawing, forming a part of this specification, in which numerals refer to similar parts throughout the several views.

Figure I is a sectional view of a portion of a bale illustrating the identification tag fastener or anchor wires twisted in intimate contact with the fibrous material in the bale.

Figure II is a perspective view of the component parts of the identification tag fastener assembly.

Figure III is a sectional view of the identification tag fastener assembly.

Figure IV is an end view of the identification tag fastener assembly.

Penetrating tool 1, of suitable tubular metallic product, is provided with bullet shape head 2 having orifices 4 and 4' situate near the base of bullet shaped head 2 in alignment with two parallel interior longitudinal channels 6 and 6' slotted in core 5. Said channels 6 and 6' function as carriers for two spring steel tag fasteners or anchor wires 3 and 3'. Said anchor wires 3 and 3' are so fashioned to form barbs 7 and 7' on one end, and on the other are annealed to permit ease in attaching tag or other suitable bale marker on the exterior of the bale.

My invention may be practiced in combination with a conventional bale of cotton or any other fibrous material by inserting anchor wires 3 and 3' full length into penetrating tool 1 (Figure III) through the orifices 4 and 4'. Straight butt end 8 of penetrating tool 1 is then gripped by the jaws of a breast drill or other similar rotating device. Bullet head 2 is placed against the side of the baled material 9 (Fig. I) and the penetrating tool rotated and forced the desired depth into the baled material. Penetrating tool 1 is then partially withdrawn, rotated a few turns; again withdrawn a short distance, again rotated a few turns, as indicated by dotted lines in the subsequent positions 10, 11, 12, 13 and 14 (Fig. I). The above procedure is completed when bullet head 2 of penetrating tool 1 reaches the outer surface of the side of the bale. Penetrating tool 1 is then withdrawn from engagement with anchor wires 3 and 3' leaving a portion of the straight ends protruding from the surface of baled material 9.

The identification tag or marker may then be affixed by means of these protruding annealed ends of anchor wires 3 and 3'.

While the foregoing is a preferred embodiment of the means for practicing my invention, I do not wish to be restricted thereto.

Having thus described my invention, I claim as new and desire to secure by Letters Patent:

1. The method of providing a bale of fibrous material with an anchoring device for attachment of identification tags; consisting of so inserting into said bale a plurality of elongated flexible members having substantially rearwardly directed ends that said ends engage a portion of said material within the bale and also extend in a direction substantially opposite to the direction of insertion; and then arranging said members to form spaced apart intertwisted sections and interposed loop means between said sections, and end portions projecting from said bale.

2. The combination of a bale of fibrous material with a device comprising a rotary penetrating tool and a plurality of resilient members, means for guiding said resilient members into said tool, means for releasably maintaining said members in a definite relation within said tool, said tool being adapted for forming spaced apart twisted sections and interposed loops between said sections on said resilient members within said bale upon subsequent intermittent rotation and partial withdrawal of said tool from said bale.

GEORGE E. GAUS.